May 30, 1939.　　　C. R. EDWARDS　　　2,160,691
OUTSIDE PIPE CUTTER
Original Filed Nov. 16, 1926　　2 Sheets-Sheet 1

Charles R. Edwards Inventor

May 30, 1939. C. R. EDWARDS 2,160,691
OUTSIDE PIPE CUTTER
Original Filed Nov. 16, 1926 2 Sheets-Sheet 2
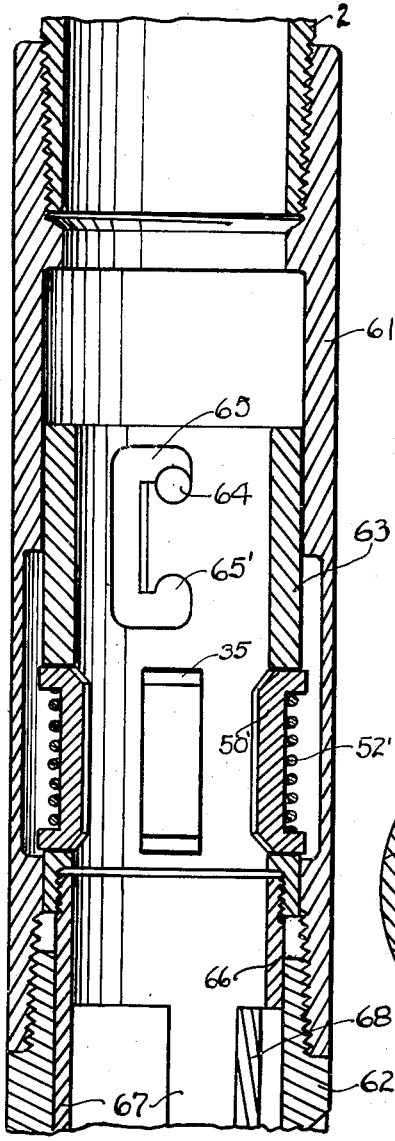
Fig. 4.
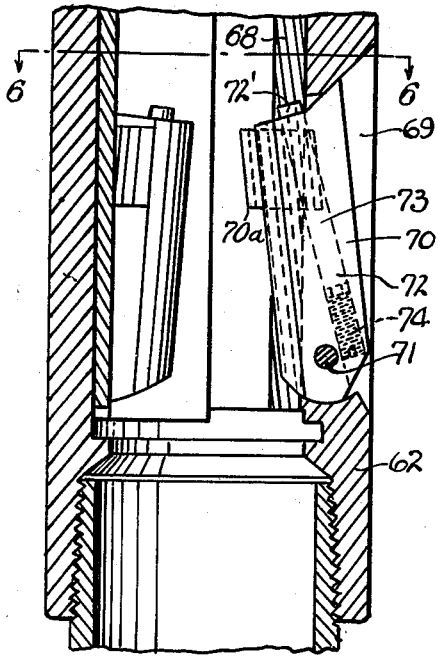
Fig. 5
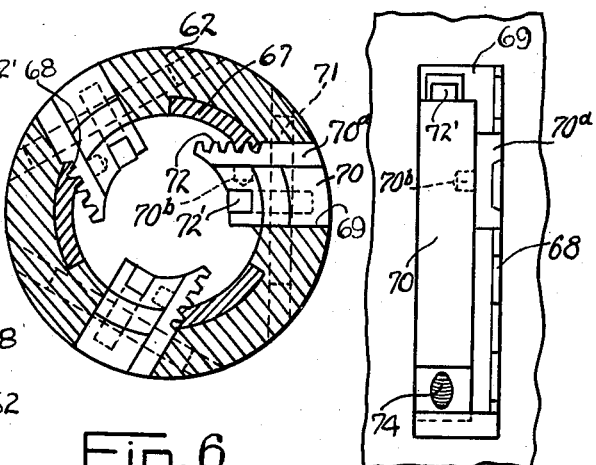
Fig. 6
Fig. 7.
Charles R. Edwards  Inventor
Jesse R. Stone
Lister B. Clark
By
Attorneys Patented May 30, 1939

2,160,691

UNITED STATES PATENT OFFICE 2,160,691

OUTSIDE PIPE CUTTER

Charles R. Edwards, Houston, Tex.

Original application November 16, 1926, Serial No. 148,691, now Patent No. 1,927,310, dated September 19, 1933. Divided and this application September 16, 1933, Serial No. 689,691

17 Claims. (Cl. 164—0.6)

My invention relates to devices for cutting pipe in wells and pertains more particularly to those pipe cutters which are designed to telescope over the outside of the pipe to be cut and rotated to sever the pipe.

The usual rotary hydraulic process drilling rig which is well known now and which is rapidly replacing other drilling equipment uses a drill stem now commonly made up of upset pipe; that is, the ends of the drill pipe has materially thickened walls at the ends where the threads are formed on the drill pipe for making connections. Tubing extensively used in producing wells also has upset ends which if cut off back a few inches from the end, is ruined for further use in its original intended purpose. Such upset tubular material has of late years become to be made of special material and this together has greatly increased the cost of such tubular material.

It will be seen that, in the removal of such drill stems and such tubing to use outside pipe cutters that cut the drill pipe or tubing itself will ruin such material for further use in its intended first purpose and thus the cost of removing such pipe and tubes should be effected with no damage to the long sections of such material.

The pipe coupling on such drill pipe and on such tubing cost but a very small fraction of the cost of the extra long sections of such pipe and there is a very considerable saving in using a pipe cutting device that does not damage the pipe or the pipe thread.

Heretofore there has been no suitable device that would sever the string of pipe and not do very considerable damage to the pipe, or at the very least, ruin the pipe threads and cause the loss of the benefit of the upset end.

It is a very important object of this invention to be able to sever the pipe string and not damage the pipe and the pipe thread.

In using outside pipe cutters it is necessary to cut the pipe in short lengths. This is due to the fact that the pipe standing up inside of the well and inside of the cutting string tends to sag down into the shape of a corkscrew and creates very great friction when it is attempted to wash down over more than several joints; therefore the loss of pipe becomes of more importance since the length of the pipe sections has increased.

It is also an object of the invention to provide means for the attachment of a guide member such as an ordinary rotary shoe or other similar means that can be used below to center the pipe to be removed from the well with the other apparatus of the invention.

It is a further object of the invention to provide for passage of the circulating fluid through the cutting apparatus at all times while the apparatus is in the well so as to assist in keeping the manipulating string of pipe and the apparatus free of material that will tend to hamper operations or to stick the apparatus.

It is also an object of the invention to provide means whereby the apparatus can be rotated while using the earth disintegrating means to cut away earthy material that may be lodged around the pipe to be removed and at the same time prevent the operation of the cutters to engage into cutting position with the pipe to be removed.

It is also an object of the invention to be able to sever the pipe to be removed by simply cutting away a part of the pipe coupling means, thereby saving pipe.

It is an object of the invention to be able to sever the pipe to be removed by making the cut in the pipe coupling means in such a manner as not to damage the pipe threads thereby saving the costs of having to transport the pipe to and from the shop and to have the pipe threads renewed thereon.

It is a further object of the invention to provide a device capable of being mounted upon a single string of pipe and lowered to engage and cut the pipe and thereafter to withdraw the cut off portion from the well.

I also desire to provide for disengaging the tool from the pipe where it becomes impossible to withdraw the cut off section.

I further desire to provide an effective means for gripping the pipe so that the tool may be properly manipulated to engage with the pipe to cut the same.

This application is a division of my prior application, Serial No. 148,691, filed November 16, 1926, and now issued as Patent 1,927,310 issued September 19, 1933.

In the drawings herewith

Figs. 4 and 5 show the upper and lower portions of another embodiment of the invention.

Fig. 6 is a transverse section on the plane 6—6 of Fig. 5.

Fig. 7 is a side view illustrating the manner in which the cutter is mounted in the support.

The invention includes the method of lowering a cutting apparatus; of centering the apparatus over and around a pipe to be removed; of establishing circulation down through the apparatus; of rotating the apparatus down around the pipe to be removed to disintegrate material from around the pipe to be removed; of removing the disintegrated material from about the pipe to be removed; of locating the apparatus at a suitable cutting point; of releasing the control; of engaging the cutters; of cutting the pipe to be removed; (and if the pipe is not cut for any reason) of releasing the cutters; of lifting the cut off section out of the well; and of withdrawing the apparatus. The cutters must be capable of withdrawal from cutting position at any time so that the tool may be drawn back upwardly in the well to allow new sections of pipe to be added whenever desired. This contingency is provided for by my invention.

Figure 1:
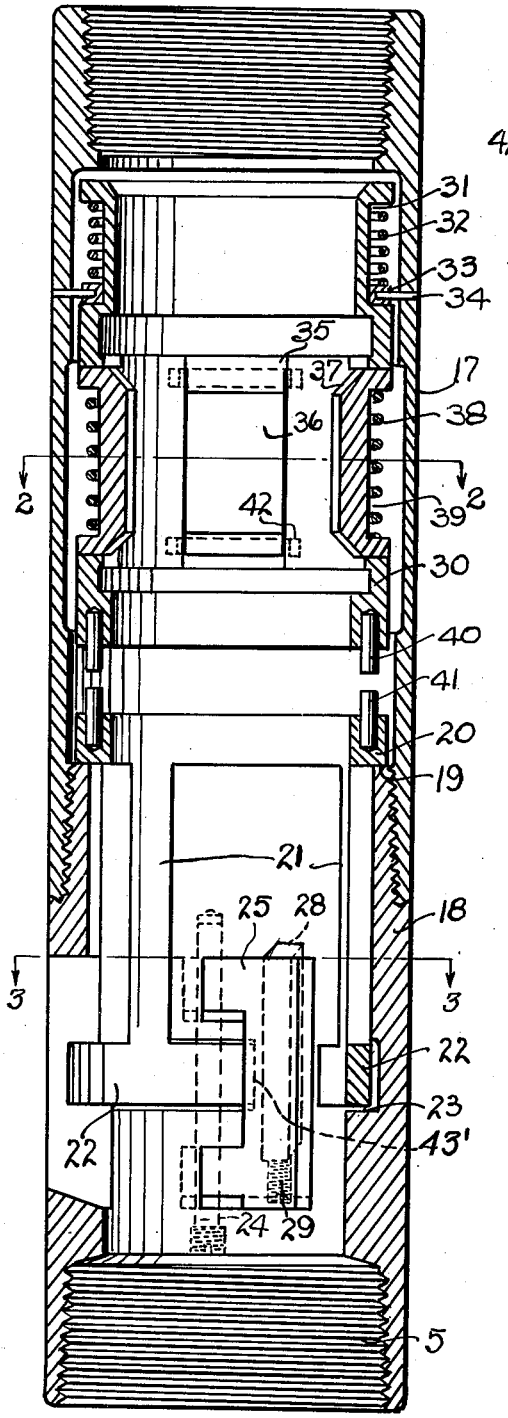
Fig. 1 is a central longitudinal section through a device embodying my invention.
Figure 2:
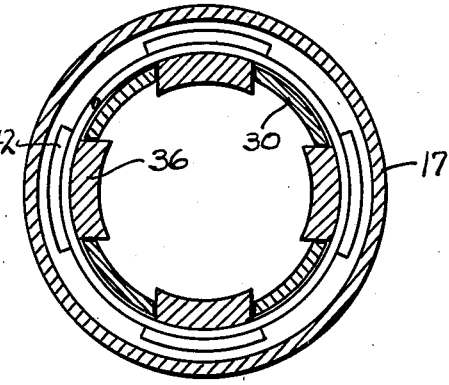
Fig. 2 is a transverse section on the plane 2—2 of Fig. 1.
Figure 3:
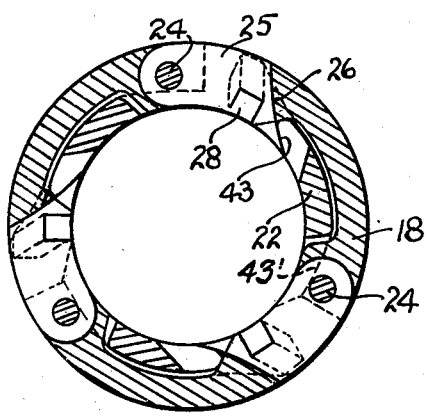
Fig. 3 is a section through Fig. 1 on line 3—3.

In Figs. 1 to 3 I have shown one embodiment of the invention. The outer housing 17 is connected at its lower end to a cutter support 18, at the upper end of which is a shoulder 19 on the interior of the housing upon which the ring 20 of the cutter actuating member is connected. The housing 17 and cutter support 18 taken together may be denominated as the cutter body.

From the ring 20 are a plurality of depending legs or supports 21 connected at their lower ends to arcuate cutter expanding members 22. The lower ends of these actuators are spaced closely above a lower shoulder 23 upon the cutter supports. The ring 20 together with the legs 21 and wedging members 22 may be designated as a wedged shaped mandrel.

The cutters are mounted in the wall of the cutter support and each has a pivoted engagement at the upper and lower ends thereof with a hinge pin 24 which extends vertically upward in the wall of the cutter support and furnishes a pivot upon which the cutter may swing.

The cutter member 25 is fitted within an opening in the side wall of the cutter support and has its free end beveled inwardly as shown at 26 in Fig. 3 to engage with the beveled or wedged shaped forward end of the cutter expanding members 22. The cutter member has longitudinally thereof a cutter knife 28 which is adjustable longitudinally in the cutter member by means of an adjustment screw shown in dotted lines at 29. The upper sharpened end of the cutter knife 28 projects above the swinging member 25 upon which it is supported and is adapted to be brought beneath a collar on the pipe.

Above the cutter support member is the cutter control which includes the actuating member 30. This member constitutes a sleeve fitting loosely within the housing and having adjacent the upper end a recessed portion 31 within which is housed a spring 32 supported at its lower end upon a ring 33, said ring being secured to the wall of the housing by screws or pins 34. Said ring rests normally, except during the pipe cutting period, upon the shoulder at the lower end of the recess 31.

Below the recessed portion the wall of the actuating sleeve 30 is formed with openings 35 therein within which are seated the gripping dogs 36. Said dogs are extended inwardly through said openings and have their upper and lower ends 37 beveled so as to engage with the collar on the pipe and pass the same. The dogs are held resiliently inward by means of a coil spring 38 extending around the housing and fitting within the recess 39 in the outer side of the dogs. Said dogs are prevented from moving inwardly beyond a certain point by means of lateral extensions 42 at each end thereof as shown in dotted lines in Fig. 1.

Below the dogs the lower end of the actuator is provided with downwardly extending pins 40 which are adapted to engage with similar pins 41 on the upper end of the mandrel or cutter expanding member. The parts 30 to 42, inclusive, may be taken as a driving means for the wedged shaped mandrel.

In the operation of this embodiment, the device is lowered over the pipe which is to be cut and the inner faces of the dogs 36 will frictionally contact with the inner stuck pipe. When the point is reached where the cut is to be made, the device is drawn upwardly and simultaneously rotated in a right-hand direction. The dogs will engage with a collar upon the pipe and when the body or housing is drawn upwardly relative thereto the pins 41 on the cutter expander will engage against the pins 40 on the actuator 30, and the expander will tend to remain stationary while the housing is rotated.

The rotation of the housing relative to the mandrel cutter expander will bring the forward beveled or wedged shaped edge 43 of the expander member 22 against the forward beveled edge 26 of the cutter holder 25 and will draw the cutter holder 25 substantially radially inwardly to bring the cutter knives 28 in contact with the pipe. A continued rotation of the housing will carry the cutter around the pipe at a point beneath the collar to cut the same away and sever the pipe. The cutters will remain below the severed section so that an upward pull upon the tool may withdraw the severed section from the well. Obviously, to release this device before a cut is completed it is only necessary to rotate backwardly a little so that the reverse beveled end (shown in dotted lines at 43') of the member 22 will force the cutter 25 outwardly to inoperative position.

In Figs. 4 to 7, inclusive, is disclosed a still further embodiment of the invention. The upper cylindrical housing 61 in this case is connected at its lower end to the cylindrical cutter supporting sleeve or cutter housing 62. The upper housing movably surrounds a control means which includes an inner sleeve 63 which is movably secured to the housing 61 through a pin 64 on the housing engaging within a C-shaped slot 65 in the control sleeve. The said control sleeve has gripping members 50' held in place by springs 52' as in the last described embodiment. The lower end of the control sleeve 63 is movably secured to a ring or mandrel 66 which has a plurality of downwardly extending slots forming the legs 67, one side of each leg having thereon spirally inclined threads or gear teeth 68.

The cutter supporting sleeve or cutter housing 62 has in the side walls thereof a plurality of openings or windows 69, at the lower end of which are pivoted cutter members or dogs 70, said dogs being pivoted on pins 71 extending transversely across the lower ends of the openings as will be noted in Fig. 6. On one side of each of the cutter dogs 70 are formed inclined teeth or threads 72 which engage with the threads 68 upon the legs 67 of the mandrel or cutter actuating member. Longitudinally of each of the dogs and inclined forwardly are bores 74 through which are extended the cutter blades 72'. These cutter blades are longitudinally adjustable in the dogs 70 by means of adjustment screws in the bores 74 at the lower end of the cutter dogs 70.

Said cutters project beyond the upper end of the dog as shown at 72' and are adapted to engage with the inner pipe when the dogs are swung inwardly at the upper end.

In Figs. 6 and 7 I have shown a means which prevents binding of the cutter member 70 as it swings in an arc inwardly and outwardly. This means comprises a relatively small block 70a having a pivot pin 70b which is received within a recess in the cutter member 70. The teeth 72 on the small block 70a engage the teeth 68 located on the legs of the mandrel 63 and since the block 70a is pivoted, the cutter member 70 is permitted to move arcuately without any binding whatsoever.

When this embodiment of the invention is operated it is lowered as in the previous embodiment so as to telescope over the upper end of the pipe which is to be cut. The pin 64 on the housing engaging in the slot 65' will hold the control including the actuating sleeve 63 in elevated position with the cutter or dogs held or locked outwardly in their retracted positions in the slots or openings 69. When the proper position upon the stuck pipe has been reached, the engagement of the control through the frictional dogs 50' against the inner stuck pipe will tend to hold the sleeve 63 of the control stationary. The housing may then be rotated or moved so as to move the pin 64 in the slot so as to position the pin 64 as is shown in Fig. 4. This will also move the mandrel including the legs 67 downwardly relative to the cutters and because of the engagement and the wedging effect of the threads 68 and 72, the cutters will be moved inwardly against the pipe, as shown in Figs. 5 and 6 and the inner ends of the dogs 70 will also center the lower end of the device about the stuck pipe. The cutters may then be rotated by turning the pipe 2 to cut into and sever the pipe, after which the upward movement of the device will carry with it the cut off section of pipe. If it is found, however, that the pipe cannot be cut, the cutter may be released from the pipe by manipulating the housing 61 so as to move the pin 64 downwardly into slot 65 to the position opposite to that shown in Fig. 4. In that last position the cutters will be retracted and locked out and the device may be withdrawn from the well, leaving a partially cut off section of pipe in position.

It will be understood that I have provided different forms of the invention which adapt the use of my inventive idea to the different conditions which may obtain in a well. In each of the devices it is possible, because of the frictional engagement between the cutter actuating member and the pipe, to manipulate the device to force the cutter inwardly against the pipe so as to sever it and thereafter to remove the cut off section by a simple upward pull carrying the cut off section supported. As has been shown, this may be accomplished in different ways, all coming within the scope of my inventive idea.

In the particular forms of the invention herein disclosed it will be seen that in each embodiment there is a body member, which in each case is made up of two separable substantially cylindrical parts. This is done for convenience of assembly but, as shown, the body need not be of any particular form or contour.

At the upper end of the body member, in each instance, means in the nature of threads, is provided for attaching an operating string of pipe that extends to an elevation above the well bore for convenience in handling and manipulating the apparatus shown.

At the lower end of the body member, in each instance, means in the nature of threads or equivalent means, is provided for the attachment of any suitable form of a guide to be used in aligning up the pipe to be removed from the well with the apparatus shown. Often conventional guides are made with cutting teeth at or near their lower ends that are useful in cutting away material that would hinder or interfere with the telescoping of the apparatus shown down over the pipe to be removed.

Space and means in the body is provided for carrying and supporting a cutting means and a cutter used to sever the pipe to be removed, and also a control means to be used to control the movements of a mandrel to actuate the cutting means into and out of the cutting position and for engaging and disengaging the lifting means that is of use in engaging and in lifting a pipe or cut off section of the pipe to be removed from the well.

As shown, the cutter blades may be associated with the body by being directly or indirectly connected to the body. The cutter may perform only the cutting act or the cutter may also be used to lift or carry a comparatively short cut off section of the pipe to be removed, or the cutter may be used in conjunction with some other support to lift a cut off section out of the well.

Numerous alterations and modifications may be made in the devices herein disclosed and it seems very obvious to the applicant that an inspection of the original parent application as filed, being Serial No. 148,691, above referred to, will show there many elements of devices in various combinations, which elements can be very easily rearranged here into many combinations, not specially shown, without departing from the actual inventive ideas back of the inventions set forth in the appended claims.

Having described my invention, what I claim is:

1. A releasable outside pipe cutting device for use in a well bore that includes the combination of: a tubular body having windows in its walls and having threads at its upper end for attaching a single string of pipe for manipulating said device and said body also having threads at its lower end for the attachment of an auxiliary tool for use in removing material from around a stuck pipe, pipe cutters located in said windows in said body, said pipe cutters having cutting edges that can be moved inwardly from outward positions to inward positions to sever a stuck pipe by cutting away a part of a coupling on the stuck pipe, a mandrel movable within said body for use when changing the position of said cutting edges of said cutters from an outward position to an inward position, and a control that includes pipe engaging members movable outwardly and inwardly in other windows as said members pass down and up past the couplings on a stuck pipe and a coiled spring coiled around said members to resiliently force said members inwardly to engage against a stuck pipe and to center the stuck pipe in said device, said device being operative whereby said cutting edges of said cutters may be retained in their outward positions when said device is being lowered or raised past the collars on a stuck pipe and also when said device is being lowered and rotated to the right to remove material from around the stuck pipe, said device when said members are engaged on a stuck pipe also being operative through manipulation of said housing to bring said cutting edges of said pipe cutters from their outward positions to their inward positions so that when said cutters are rotated to the right and simultaneously raised against a coupling on the stuck pipe the coupling can be cut away to sever the stuck pipe without serious injury to the long sections of the stuck pipe and also that when said device is withdrawn from the well bore the cut off part of the stuck pipe can be supported in said device and the cut off section can also be removed from the well bore all during a single round trip of said device into the well bore.

2. A releasable outside pipe cutting device for use in a well bore including the combination of: a hollow cutter body, a pipe cutter secured to said body in such a manner as to permit the cutting edge of said cutter to move to operative and to non-operative positions, a mandrel within said body to hold said cutter in non-operative position and also to move said cutter to operative position and also to move said cutter to non-operative position said mandrel being movable relatively to said body and also to said cutting edge and a control movable within said body to move said mandrel relatively to said body and said cutting edge, said control including an engaging member to engage a stuck pipe, said member being formed with outwardly flared angular surfaces at both its upper and lower ends so as to guide said member outwardly when said control is moved in either direction past a pipe coupling and a means to resiliently force said member inwardly into frictional contact with a stuck pipe, said combination being operative whereby said cutting edge may be retained in its non-operative position when said device is being rotated to the right and lowered down around a stuck pipe and the couplings thereon, said combination also being operative to retain said cutting edge in its non-operative position when said device is being raised up past the couplings on the stuck pipe, said combination when said member is engaged with a stuck pipe also being operative by manipulation of said body to cause said cutting edge to change from non-operative position to operative position so said cutting edge can be used to sever the stuck pipe, said combination also being operative by manipulation of said body to cause said cutting edge to change from operative to inoperative position.

3. A releasable outside pipe cutter including in combination a cutter body, a plurality of radially movable cutters therein, a mandrel arranged to be moved between and to rotate with said cutters and said body whereby said cutters will be moved inwardly, driving means for moving said mandrel, said driving means including means adapted to engage the pipe being cut and means between the cutter body and said driving means to control said driving means whereby said mandrel will be moved up or down upon relative respective movement of said body.

4. A releasable outside pipe cutter including in combination a cutter body, a plurality of radially movable cutters therein, a forked mandrel arranged to be moved between and to rotate with said cutters and said body whereby said cutters will be moved inwardly in a controlled manner, and driving means for moving said mandrel up and down and including means adapted to engage the pipe being cut and means within the cutter body to control the up and down movement of said driving means whereby said mandrel will be moved longitudinally upon relative movement of said body, the movement of said mandrel being directly proportional to the amount of vertical movement of said driving means.

5. A releasable pipe cutter having cutting blades adapted to be moved inwardly to cutting position and outwardly from cutting position directly in proportion to the amount of relative movement of another part thereto, means to engage the pipe being cut, a forked mandrel disposed so that it will straddle the cutting blades, and means whereby said mandrel engages with the cutter blades to advance them to cutting position and to withdraw them by a wedging action to force said blades inwardly and outwardly an amount directly proportional to the movement of said mandrel.

6. A device of the character described including a slotted hollow circular mandrel, cutting members disposed in said slots, co-operating faces on the edges of the slotted portions of said mandrel and said members whereby said members are advanced toward the hollow portion of said mandrel, and a tongue and groove construction between said mandrel and the edges of the slots in said members to limit the rate of travel thereof to a direct proportion of the movement of said mandrel.

7. A releasable cut and pull pipe cutter including in combination a housing, cutters, pivotally supported in said housing, to engage the pipe, relatively movable mandrel to actuate said cutters in proportion to the amount of movement thereof, and means on said mandrel to lock said cutters in retracted position but permitting movement of said cutters upon movement of said mandrel, and releasable pipe engaging means associated with said mandrel to control the actuation of said cutters.

8. A releasable device of the character described including a mandrel, releasable cutting members, co-operating faces on said mandrel and said cutting members whereby said members are advanced toward and down from the hollow portion of said mandrel to limit the rate of travel thereof to a direct proportion of the movements of said mandrel, and means arranged to move said mandrel directly in proportion to the amount of movement of the device.

9. An outside pipe cutter including in combination cutters to engage the pipe, a vertically movable mandrel to actuate said cutters, and means on said mandrel to lock said cutters in retracted position when said mandrel is retracted, said means including co-operating beveled faces on said cutters and said mandrel adapted for separation upon operation of the cutter.

10. A releasable outside pipe cutting and pulling device adapted to be connected to a single string of pipe, comprising a tubular housing, a cutting member secured thereto to swing inwardly, an actuating sleeve in said housing, means associated with said sleeve to frictionally engage an inner pipe, and feeding means on said actuating sleeve adapted to engage said member and move it inwardly or outwardly when said feeding means is moved relative to said member, said member being held in active engagement with the pipe by a movement of said device.

11. A releasable outside pipe cutting and pulling device adapted to be connected to a single string of pipe, comprising a tubular housing, a cutting member secured thereto to cut pipe, an actuating sleeve in said housing to control the inward and outward movements of said cutting member, means associated with said sleeve to engage an inner pipe, means on said housing and actuating sleeve cooperating to hold said sleeve in a plurality of positions, and means on said actuating sleeve engaging with said cutting member to move the same to or from the inner pipe depending upon the direction of movement of said sleeve relative to said housing.

12. A releasable outside pipe cutting and pulling tool adapted to be connected to a single string of pipe, comprising a tubular housing, a cutting device secured thereto to sever an inner string of pipe, an actuating sleeve in said housing, means associated with said sleeve to engage an inner pipe, and means on said sleeve acting to hold said cutting device in inoperative position, said cutting device being moved by a movement of said sleeve relative to said cutting means.

13. In a releasable outside pipe cutting and pulling device, a tubular housing, frictional means located in windows and formed arcuate in cross section and with bevels set at angles to their upper and lower ends so as to permit said means to pass down and up past pipe couplings and a spring coiled around said means to urge said means inwardly so as to resiliently engage the inner stuck pipe, pipe cutters located in windows in said housing, a cutter actuator in said housing, means to control the movement of said cutters and of use in shifting said cutters from inactive position to active position and from active position to inactive position by movements of said housing relative to said actuator, operative means to normally hold said cutters out of contact with the stuck pipe, during preliminary operations, said cutters being adapted by manipulation of said housing and actuator to engage the pipe when said actuator is moved relative to said housing.

14. In a releasable pipe cutting and pulling device, a tubular housing, frictional means formed with bevels set at angles to their upper and lower ends so as to permit said means to pass down and up past pipe couplings and a means to urge said frictional means inwardly so as to resiliently engage the inner pipe, pipe cutters located in windows at the lower end of said housing, a mandrel in said housing connected to said cutters to hold said cutters in retracted position, a control for said mandrel that includes said frictional means operated by movement of said housing and of use in shifting said cutters from inoperative to operative position and from operative to inoperative position, said cutters are operative to sever a pipe by an upward pull on said housing as said housing is rotated.

15. In a releasable outside pipe cutting and pulling device a tubular housing, cutter dogs pivoted to swing inwardly thereon, a ring means contacting with said dogs to hold said dogs and to move said dogs in and out, frictional pipe engaging means having an operative connection with said ring to control the in and out movement of said dogs by movement of said housing to swing said dogs.

16. A releasable cut and pull pipe cutter including in combination a housing, cutters pivotally supported in said housing to sever the pipe, a relatively movable mandrel to actuate said cutters, means to lock said cutters in retracted position, and means operable in a well bore whereby said cutters may be returned to retracted position after said mandrel is moved.

17. A releasable cut and pull pipe cutter including in combination a housing, cutters pivotally supported in said housing to engage the pipe, a relatively movable mandrel to actuate said cutters, and means operable in a well bore whereby said cutters may be moved to retracted position after said cutters have been moved toward said pipe.

CHARLES R. EDWARDS.